United States Patent
Kato et al.

(10) Patent No.: US 10,132,638 B2
(45) Date of Patent: Nov. 20, 2018

(54) ROUTE SEARCH SYSTEM, ROUTE SEARCH METHOD, AND COMPUTER PROGRAM

(71) Applicants: AISIN AW CO., LTD., Anjo-shi, Aichi-ken (JP); TOYOTA JIDOSHA KABUSHIKI KAISHA, Toyota-shi, Aichi-ken (JP)

(72) Inventors: Tatsuya Kato, Anjo (JP); Daisuke Tanizaki, Okazaki (JP); Toyoji Hiyokawa, Okazaki (JP); Motohiro Nakamura, Okazaki (JP); Kazunori Watanabe, Okazaki (JP); Hiroyuki Tashiro, Kitakyushu (JP); Tomoko Arita, Munakata (JP)

(73) Assignees: AISIN AW CO., LTD., Anjo (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/503,938

(22) PCT Filed: Aug. 31, 2015

(86) PCT No.: PCT/JP2015/074662
§ 371 (c)(1),
(2) Date: Feb. 14, 2017

(87) PCT Pub. No.: WO2016/035745
PCT Pub. Date: Mar. 10, 2016

(65) Prior Publication Data
US 2017/0254655 A1 Sep. 7, 2017

(30) Foreign Application Priority Data
Sep. 3, 2014 (JP) .................................. 2014-178893

(51) Int. Cl.
*G01C 21/34* (2006.01)
*G01C 21/36* (2006.01)
(Continued)

(52) U.S. Cl.
CPC ....... *G01C 21/3423* (2013.01); *G06Q 10/047* (2013.01); *G01C 21/3446* (2013.01);
(Continued)

(58) Field of Classification Search
CPC .......................... G01C 21/3423; G06Q 10/047
See application file for complete search history.

(56) References Cited

U.S. PATENT DOCUMENTS

| 6,349,261 | B1 |   | 2/2002 | Ohnishi et al. |   |
|---|---|---|---|---|---|
| 6,421,606 | B1 | * | 7/2002 | Asai et al. | G01C 21/3423 |
|   |   |   |   |   | 701/410 |
| 8,731,814 | B2 | * | 5/2014 | Schunder | G01C 21/3423 |
|   |   |   |   |   | 701/410 |
| 9,217,647 | B2 | * | 12/2015 | Pech et al. | G01C 21/3423 |

(Continued)

FOREIGN PATENT DOCUMENTS

| EP | 1 077 362 A1 | 2/2001 |
| JP | 2000-258184 A | 9/2000 |

(Continued)

OTHER PUBLICATIONS

Nov. 17, 2015 Search Report issued in International Patent Application No. PCT/JP2015/074662.

(Continued)

*Primary Examiner* — Dale W Hilgendorf
(74) *Attorney, Agent, or Firm* — Oliff PLC

(57) ABSTRACT

Route search systems, methods, and programs search for a recommended route for transfer with switching between a plurality of transportation modes. The systems, methods, and programs acquire link information for specifying a link for transfer by each of the plurality of transportation modes and connection information related to connection between links for transfer by different transportation modes, and set (Continued)

a condition for switching from a first transportation mode to a second transportation mode, which is different from the first transportation mode, on the basis of a combination of the first transportation mode and the second transportation mode. The systems, methods, and programs search for the recommended route for transfer with switching between the plurality of transportation modes on the basis of the link information, the connection information, and the set condition, the recommended route connecting links for transfer by different transportation modes.

7 Claims, 4 Drawing Sheets

(51) Int. Cl.
    *G06Q 10/04*     (2012.01)
    *H04L 29/08*     (2006.01)
    *G06Q 30/02*     (2012.01)
    *G06Q 50/10*     (2012.01)
    *G08G 1/005*     (2006.01)

(52) U.S. Cl.
    CPC ......... *G01C 21/3676* (2013.01); *G06Q 30/02* (2013.01); *G06Q 50/10* (2013.01); *G08G 1/005* (2013.01); *H04L 67/18* (2013.01)

(56) References Cited

U.S. PATENT DOCUMENTS

| | | | |
|---|---|---|---|
| 9,273,970 B2 * | 3/2016 | Graells et al. ..... | G01C 21/3423 |
| 2011/0010084 A1 * | 1/2011 | Carlsson et al. ... | G01C 21/3423 701/533 |
| 2012/0310520 A1 * | 12/2012 | Kanno et al. ...... | G01C 21/3423 701/400 |
| 2013/0046456 A1 * | 2/2013 | Scofield et al. ... | G01C 21/3423 701/117 |
| 2014/0188788 A1 * | 7/2014 | Bridgen et al. .... | G01C 21/3423 707/609 |

FOREIGN PATENT DOCUMENTS

| | | |
|---|---|---|
| JP | 2003-148985 A | 5/2003 |
| JP | 2006-292447 A | 10/2006 |
| JP | 3983034 B2 | 9/2007 |
| JP | 4550697 B2 | 9/2010 |
| JP | 2012-058157 A | 3/2012 |
| JP | 2012-117876 A | 6/2012 |
| JP | 2013-108804 A | 6/2013 |

OTHER PUBLICATIONS

Aug. 1, 2017 Supplementary Search Report issued in European Application No. 15837247.4.

* cited by examiner

FIG. 2

| DEPARTURE LOCATION \ ARRIVAL LOCATION | ARRIVAL LOCATION | FOLLOWING (SECOND TRANSFER MEANS) | | | | | | | | |
|---|---|---|---|---|---|---|---|---|---|---|
| | | WALKING | PRIVATE CAR | TAXI | RENTAL CAR | RAILROAD | BUS | SHIP (FOR PASSENGERS) | SHIP (CAR FERRY) | AIRPLANE |
| DEPARTURE LOCATION | - | STARTABLE IN CASE OF STARTING BY TRANSFER MEANS OTHER THAN PRIVATE CAR | STARTABLE IN CASE OF STARTING BY PRIVATE CAR | STARTABLE IN CASE OF STARTING BY TRANSFER MEANS OTHER THAN PRIVATE CAR | STARTABLE IN CASE WHERE DEPARTURE LOCATION IS RENTAL CAR SHOP OR IN CASE OF STARTING BY RENTAL CAR | STARTABLE IN CASE WHERE DEPARTURE LOCATION IS STATION | STARTABLE IN CASE WHERE DEPARTURE LOCATION IS BUS STOP | STARTABLE IN CASE OF STARTING BY TRANSFER MEANS OTHER THAN PRIVATE CAR OR RENTAL CAR AND IN CASE WHERE DEPARTURE LOCATION IS PORT | STARTABLE IN CASE OF STARTING BY PRIVATE CAR OR RENTAL CAR AND IN CASE WHERE DEPARTURE LOCATION IS PORT | STARTABLE IN CASE WHERE DEPARTURE LOCATION IS AIRPORT |
| WALKING | REACHABLE | - | CHANGEABLE ONLY AT POSITION AT WHICH PRIVATE CAR IS PARKED | CHANGEABLE AT NODE BETWEEN PEDESTRIAN ROAD AND VEHICLE ROAD | CHANGEABLE AT RENTAL CAR SHOP | CHANGEABLE | CHANGEABLE | CHANGEABLE | - | CHANGEABLE |
| PRIVATE CAR | REACHABLE IN CASE WHERE DESTINATION LOCATION HAS PARKING LOT | CHANGEABLE IN PARKING LOT | | - | | CHANGEABLE IN PARKING LOT FOR STATION THAT SUPPORTS P&R | CHANGEABLE IN PARKING LOT FOR BUS STOP THAT SUPPORTS P&R | CHANGEABLE IN PARKING LOT FOR PORT THAT SUPPORTS P&R | CHANGEABLE | CHANGEABLE IN PARKING LOT FOR AIRPORT THAT SUPPORTS P&R |
| TAXI | REACHABLE | - | | - | | - | - | - | - | CHANGEABLE |
| RENTAL CAR | REACHABLE IN CASE WHERE DESTINATION LOCATION HAS PARKING LOT | CHANGEABLE IN PARKING LOT | | - | | CHANGEABLE IN PARKING LOT FOR STATION THAT SUPPORTS P&R | CHANGEABLE | CHANGEABLE | - | CHANGEABLE IN PARKING LOT FOR AIRPORT THAT SUPPORTS P&R |
| RAILROAD | REACHABLE IF DESTINATION LOCATION IS STATION | CHANGEABLE | CHANGEABLE AT STATION WHICH SUPPORTS P&R AND AT WHICH CAR IS PARKED | CHANGEABLE | CHANGEABLE IF STATION HAS RENTAL CAR SHOP | | CHANGEABLE | CHANGEABLE | - | CHANGEABLE |
| BUS | REACHABLE IF DESTINATION LOCATION IS BUS STOP | CHANGEABLE | CHANGEABLE AT BUS STOP WHICH SUPPORTS P&R AND AT WHICH CAR IS PARKED | CHANGEABLE | - | CHANGEABLE | | CHANGEABLE | - | CHANGEABLE |
| SHIP (FOR PASSENGERS) | REACHABLE IF DESTINATION LOCATION IS PORT | CHANGEABLE | CHANGEABLE AT PORT WHICH SUPPORTS P&R AND AT WHICH CAR IS PARKED | CHANGEABLE | - | CHANGEABLE | CHANGEABLE | | - | CHANGEABLE |
| SHIP (CAR FERRY) | REACHABLE IF DESTINATION LOCATION IS PORT | | CHANGEABLE | - | - | - | - | - | | - |
| AIRPLANE | REACHABLE IF DESTINATION LOCATION IS AIRPORT | CHANGEABLE | CHANGEABLE AT AIRPORT WHICH SUPPORTS P&R AND AT WHICH CAR IS PARKED | CHANGEABLE | CHANGEABLE IF AIRPORT HAS RENTAL CAR SHOP | CHANGEABLE | CHANGEABLE | CHANGEABLE | - | CHANGEABLE |

FOREGOING (FIRST TRANSFER MEANS)

\* BLANK INDICATES COMBINATION WITH INFEASIBLE CHANGE

FIG. 4
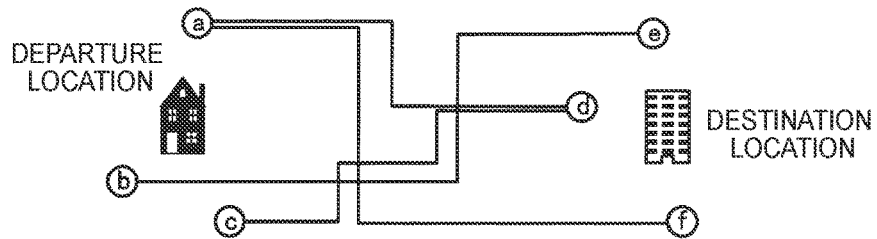
FIG. 5
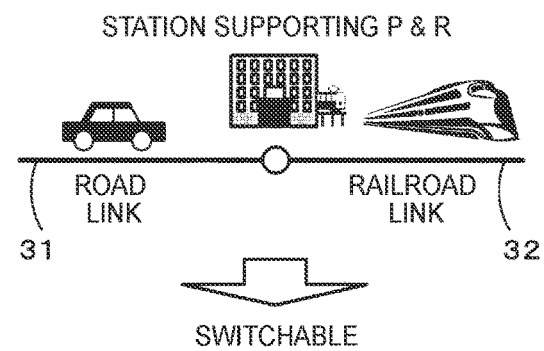
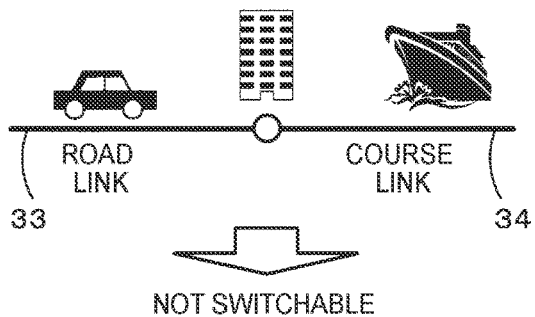
FIG. 6
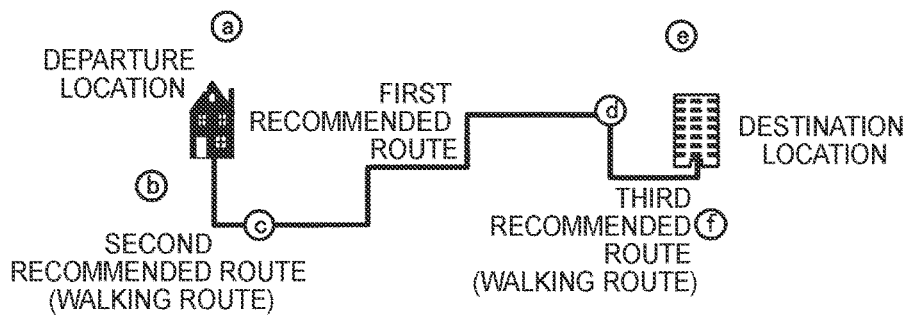

ROUTE SEARCH SYSTEM, ROUTE SEARCH METHOD, AND COMPUTER PROGRAM

TECHNICAL FIELD

Related technical fields include route search systems, methods, and computer programs for searching for a recommended route for transfer with switching between a plurality of transfer means.

BACKGROUND

In recent years, many vehicles are provided with a navigation apparatus that provides travel guidance for the vehicle to allow a driver to easily reach a desired destination location. The navigation apparatus is a device that can detect the current position of the vehicle using a GPS receiver or the like and acquire map data corresponding to the current position from a storage medium such as a DVD-ROM or an HDD or through a network to display the map data on a liquid crystal monitor. Furthermore, such a navigation apparatus is provided with a route search function for searching for an optimum route from the vehicle position to a desired destination location when such a destination location is input, and adapted to set the optimum route found in the search as a route for guidance, display the route for guidance on a display screen, and provide audio guidance in the case where the vehicle approaches an intersection or the like in order to reliably guide a user to the desired destination location. In recent years, in addition, some cellular phones, smartphones, tablet terminals, personal computers, and so forth also have a function that is similar to that of the navigation apparatus described above.

With the route search function described above, in addition, a search is performed for an optimum route on the assumption of transfer with switching between a plurality of transfer means (such as walking, private car, bus, and railroad, for example), rather than a search is performed for an optimum route simply from a departure location to a destination location (see Japanese Patent Application Publication No. 2000-258184 (JP 2000-258184 A) and Japanese Patent Application Publication No. 2012-58157 2012-58157 A), for example).

SUMMARY

However, JP 2000-258184 A describes searching for an optimum route with a combination of transfer by walking and transfer by railroad, but does not describe searching for a route that includes use of other transfer means. For example, even in the case where it is more appropriate to transfer from a departure location to a destination location by a private car than by railroad, a search cannot be performed for such a route. Meanwhile, switching from walking to railroad is made at a station located within a radius of 700 m from the departure location and the destination location. However, the actual distance of transfer by walking from the departure location and the destination location to the station is not taken into consideration. A user is occasionally instructed to get on a train at a station that is inappropriate for the user, and a search may not be performed to find an appropriate route.

Meanwhile, JP 2012-58157 A describes searching or an optimum route with a combination of transfer by car, transfer by railroad, transfer by bus, and transfer by walking, but does not describe appropriately setting a condition for switching between transfer means. That is, a search may be performed to find an infeasible route, such as a route with transfer to a station by a private car, parking the private car in a parking lot near the station, getting on a train to transfer to a station that is the closest to the destination location, and transfer by the private car again.

Exemplary embodiments of the broad inventive principles described herein address the foregoing issue of the related art, and therefore has an object to provide a route search system, a route search method, and a computer program capable of searching for a more appropriate route for a user by setting a condition for switching between transfer means on the basis of a combination of the transfer means in the case where a search is performed for a recommended route for transfer with switching between a plurality of transfer means.

Exemplary embodiments provide route search systems, methods, and programs that search for a recommended route for transfer with switching between a plurality of transportation modes. The systems, methods, and programs acquire link information for specifying a link for transfer by each of the plurality of transportation modes and connection information related to connection between links for transfer by different transportation modes, and set a condition for switching from a first transportation mode to a second transportation mode, which is different from the first transportation mode, on the basis of a combination of the first transportation mode and the second transportation mode. The systems, methods, and programs search for the recommended route for transfer with switching between the plurality of transportation modes on the basis of the link information, the connection information, and the set condition, the recommended route connecting links for transfer by different transportation modes.

The "transfer means" includes means that allows a user to freely select a transfer route in accordance with his/her intention such as walking and private car, in addition to public transportation systems with transfer routes determined in advance such as bus and railroad.

With the route search system the route search method, and the computer program configured as described above, it is possible to prevent an infeasible route from being found as in the related art, by setting a condition for switching between transfer means on the basis of a combination of the transfer means in the case where a search is performed for a recommended route for transfer with switching between a plurality of transfer means. In addition, transfer is not limited to use of particular transfer means, but optimum transfer means can be selected from among the plurality of transfer means in accordance with the situation, and switching between the transfer means can be made without contradiction. Thus, it is possible to find a more appropriate route for a user.

BRIEF DESCRIPTION OF THE DRAWINGS

FIG. 2 illustrates a switching condition table.

FIG. 4 illustrates a first candidate location and a second candidate location.

FIG. 5 illustrates s itching between transfer means.

FIG. 6 illustrates a recommended route that is finally selected.

DETAILED DESCRIPTION OF EXEMPLARY EMBODIMENTS

A route search system, embodied as a communication terminal, according to an embodiment will be described in detail below with reference to the drawings.

A communication terminal 1 may be an information communication terminal that includes a navigation function such as a function for specifying the current position of the communication terminal 1 (i.e. the current position of a user) such as GPS and a function of displaying a map image around the current position of the user, and may be a navigation apparatus, a cellular phone, a PDA, a tablet terminal, a smartphone, a personal computer, and so forth, for example. In particular, a navigation application is installed in the communication terminal 1 other than the navigation apparatus. The navigation application is an application that executes the navigation function in the communication terminal 1. Examples of the navigation function include displaying a map image and traffic information around the current position of the communication terminal 1 (user) on the basis of map information and traffic information acquired from a server or stored in a memory, displaying the current position of the communication terminal 1 (user) on the displayed map image, searching for and providing guidance on a route between a departure location and a destination location that have been set, and providing location information such as facilities, place names, etc. around the route. In the embodiment, in particular, in the case where a search is performed for a route from a departure location to a destination location, a search is performed for a recommended route in consideration of transfer with switching between a plurality of transfer means such as walking, private car, taxi, rental car, railroad, bus, ship, and airplane.

It is not necessary that the navigation application should include all the navigation functions described above.

Figure 1:
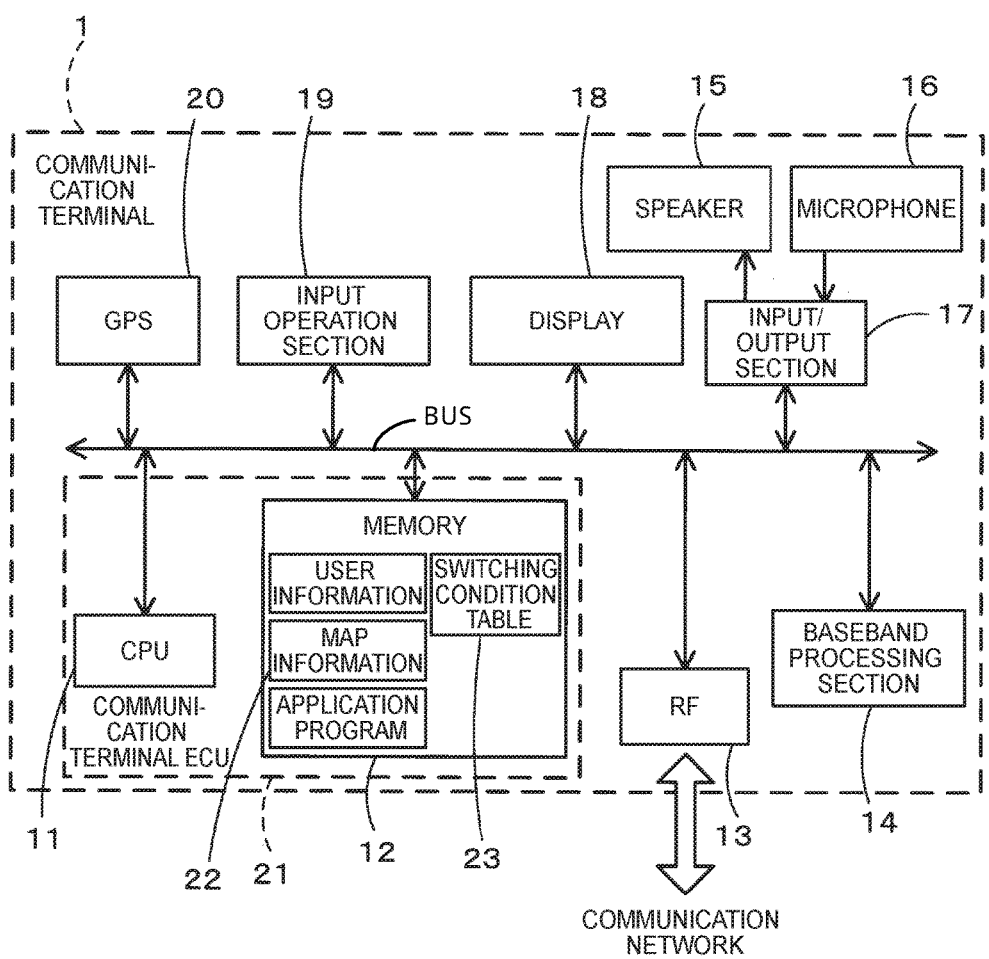
FIG. 1 a block diagram illustrating the configuration of a communication terminal according to an embodiment.

Next, a schematic configuration of the communication terminal 1 will be described with reference to FIG. 1. FIG. 1 is a block diagram schematically illustrating a control system of the communication terminal 1 according to the embodiment. In the following embodiment, in particular, a smartphone is used as the communication terminal 1.

As illustrated in FIG. 1, the communication terminal 1 includes a data bus BUS and components connected to the data bus BUS, namely a CPU 11, a memory 12 that stores user information (such as a user ID and a name) related to the user who possesses the communication terminal 1, map information, and so forth, a transmission/reception circuit section (RF) 13 that transmits and receives a signal to and from a base station, a baseband processing section 14 that converts an RF (Radio Frequency) signal received by the transmission/reception circuit section 13 into a baseband signal and that converts a baseband signal into an RF signal, an input/output section 17 that serves as an interface for a microphone 16, a speaker 15, and so forth, a display 18 that has a liquid crystal display panel or the like, an input operation section 19 that has a touch panel, character input keys, and so forth, and a GPS 20.

The CPU 11 which is built in the communication terminal 1 is a control means of the communication terminal 1 for executing various types of operation in accordance with an operation program stored in the memory 12, and is included in a communication terminal ECU 21 together with the memory 12. The content of various types of processing performed by the communication terminal ECU 21 is displayed on the display 18 as necessary. The communication terminal ECU 21 has various means as processing algorithms. For example, link information acquisition means acquires link information for specifying a link for transfer by each of a plurality of transfer means and connection information related to connection between links for transfer by different transfer means. Condition setting means sets a condition for switching from first transfer means to second transfer means, which is different from the first transfer means, on the basis of a combination of the first transfer means and the second transfer means. Route search means searches for a recommended route for transfer with switching between a plurality of transfer means on the basis of the link information, the connection information, and the condition set by the condition setting means, the recommended route connecting links for transfer by different transfer means.

The communication terminal 1 can communicate via the transmission/reception circuit section 13 to be capable of Internet communication and receiving traffic information composed of congestion information, restriction information, traffic accident information, and so forth transmitted from a traffic information center, e.g. a VICS registered trademark) center and a probe center, besides making a call.

The memory 12 is a storage medium that stores, besides user information (such as a user ID and a name) related to the user who possesses the communication terminal 1 and map information 22, an installed application program, a switching condition table 23, a route search processing program (FIG. 3) to be discussed later, and so forth. As used herein, the term "storage medium" is not intended to encompass transitory signals.) The map information 22 and the switching condition table 23 may be acquired from an external server through communication, rather than being stored in the memory 12. The memory 12 may have a hard disk, a memory card, an optical disk such as a CD and a DVD or the like.

The map information 22 is a storage means for storing link data on links, node data on node points, search data for use in route search processing, facility data on facilities, map display data for displaying a map, intersection data on intersections, retrieval data for retrieving a location, and so forth, for example. In the embodiment, a search is performed for a route that uses railroad, bus, ship, and airplane as transfer means. Thus, the map information 22 also stores various types of information for searching for a route that uses such transfer means (such as railroad tracks, railroad timetables, bus stops, bus lines, bus timetables, ship courses, ship timetables, airplane courses, and airplane timetables). For the facility data, further, the map information 22 also stores information that indicates whether or not particular facilities such as stations, ports, and airports support a park-and-ride scheme.

The link data and the node data included in the map information 22 also have railroad line networks, bus line networks, ship course networks, and airplane course networks in addition to road networks over which vehicles and pedestrians transfer. That is, in the road networks, intersections serve as nodes, and roads between the intersections serve as links. In the railroad line networks, stations serve as nodes, and tracks between the stations serve as links. In the bus line networks, bus stops serve as nodes, and travel sections between the bus stops serve as links. In the ship course networks, ports serve as nodes, and transfer sections between the ports serve as links. In the airplane course networks, airports serve as nodes, and flight sections between the airports serve as links.

The stored search data include various data for use in route search processing for searching for a route from a departure location (e.g. the current position of the vehicle) to a set destination location as discussed later. Specifically, the stored search data include cost calculation data for use to calculate a search cost such as a cost (hereinafter referred to as a "node cost") obtained by quantifying the degree of suitability of a node such as an intersection and a station for a route and a cost (hereinafter referred to as a "link cost") obtained by quantifying the degree of suitability of a link that constitutes a road, a track, or the like for a route.

The node cost is set for each node corresponding to an intersection, a station, or the like included in the route as the object for calculation of the search cost, and calculated in accordance with the presence or absence of a traffic signal, the travel route (that is, whether the vehicle travels straight ahead, makes a right turn, or makes a left turn) of the vehicle when passing through the intersection, the waiting time for a change at the station, and so forth.

The link cost is set for each link included in the route as the object for calculation of the search cost, and calculated on the basis of the length of the link and in consideration of the road attribute, road type, road width, the number of lanes, type of a train that travels on the track (such as a subway train, a conventional train, or an express train), etc. of the link.

The communication terminal 1 according to the embodiment searches for a route that uses railroad, bus, ship, and airplane as transfer means, besides vehicle and walking, using the link data, the node data, the search data, and so forth, and searches for a recommended route by comparing routes that use such transfer means. For switching between transfer means in the routes, restrictions are provided as discussed later such that the routes do not include infeasible switching between transfer means.

The switching condition table 23 is a table that prescribes a condition for switching between a plurality of different transfer means for each combination of transfer means. In the case where a search is performed for a recommended route for transfer with switching between a plurality of transfer means, the communication terminal ECU 21 references the switching condition table 23 to search for a recommended route for transfer with switching between a plurality of transfer means in accordance with the condition prescribed in the switching condition table 23. FIG. 2 illustrates an example of the switching condition table 23.

As illustrated in FIG. 2, the switching condition table 23 prescribes the condition for switching from first transfer means (foregoing) to second transfer means (following) on the basis of the combination of the first transfer means and the second transfer means. The condition for switching prescribed in the switching condition table 23 includes not only whether or not switching is possible but also a condition under which the switching can be made, or a condition under which the switching cannot be made, in the case where the switching is possible. In order to facilitate the route search processing, the departure location and the destination location are also included in the switching condition table 23 as transfer means, although the departure location and the destination location are not transfer means, to be exact.

For example, in the case where the first transfer means is "walking" and the second transfer means, to which switching is to be made, is "private car", the switching condition prescribes that "switching can be made at a position at which the private car is parked". That is, in the case where the route search processing is performed, the communication terminal ECU 21 searches for a recommended route under the restriction that the transfer means is not switched from walking to private car at a position other than the position at which the private car is parked.

In the case where the first transfer means is "private car" and the second transfer means, to which switching is to be made, is "railroad", the switching condition prescribes that "switching can be made in a parking lot for a station that supports the park-and-ride scheme". That is, in the case where the route search processing is performed, the communication terminal ECU 21 searches for a recommended route under the restriction that the transfer means is not switched from private car to railroad at a position other than a parking lot for a station that supports the park-and-ride scheme. The switching condition may simply prescribe that "switching can be made in a parking lot for a station that has a parking lot nearby", rather than a parking lot that supports the park-and-ride scheme. The same also applies to the bus stops, the ports, and the airports.

In the case where the first transfer means is "walking" and the second transfer means, to which switching is to be made, is "ship (car ferry)", the table prescribes that switching cannot be made under any conditions. That is, in the case where the route search processing is performed, the communication terminal ECU 21 searches for a recommended route under the restriction that the transfer means is not switched from walking to ship (car ferry) under any conditions.

In the case where the first transfer means is "railroad" and the second transfer means, to which switching is to be made, is "bus", the table prescribes that switching can be made particularly unconditionally. That is, in the case where the route search processing is performed, the communication terminal ECU 21 searches for a recommended route with no particular restriction on switching of the transfer means from railroad to bus.

The display 18 is disposed on one surface of a housing, and may be a liquid crystal display, an organic EL (electroluminescent) display, or the like. The display 18 displays a top screen for executing various applications installed in the communication terminal 1, screens related to executed applications (such as an Internet screen, a mail screen, and a navigation screen), and various types of information such as an image and a movie. In particular, a map image including roads, traffic information, a route for guidance from a departure location to a destination location, information on guidance along the route for guidance, and so forth are displayed on the navigation screen which is displayed in the case where the navigation application is executed.

The input operation section 19 has a touch panel provided on the front surface of the display 18. The communication terminal ECU 21 performs control in order to execute various types of associated operation on the basis of an electrical signal output in response to tapping on the touch panel etc. In the embodiment, in particular, the input operation section 19 is used to operate an icon on a top screen, make various select and input operations on an application that has been started, and so forth. The input operation section 19 may have various keys etc. such as a numeral/character input key, a cursor key for moving a cursor for selecting a displayed content, and an enter key for deciding on a selection.

The GPS 20 can receive radio waves generated by artificial satellites to detect the current position of the communication terminal 1 (i.e. the user) and the current time. Besides the GPS 20, a device (such as a gyro sensor, for example) that detects the current position of the communication terminal 1 and the orientation may be provided.

Figure 3:
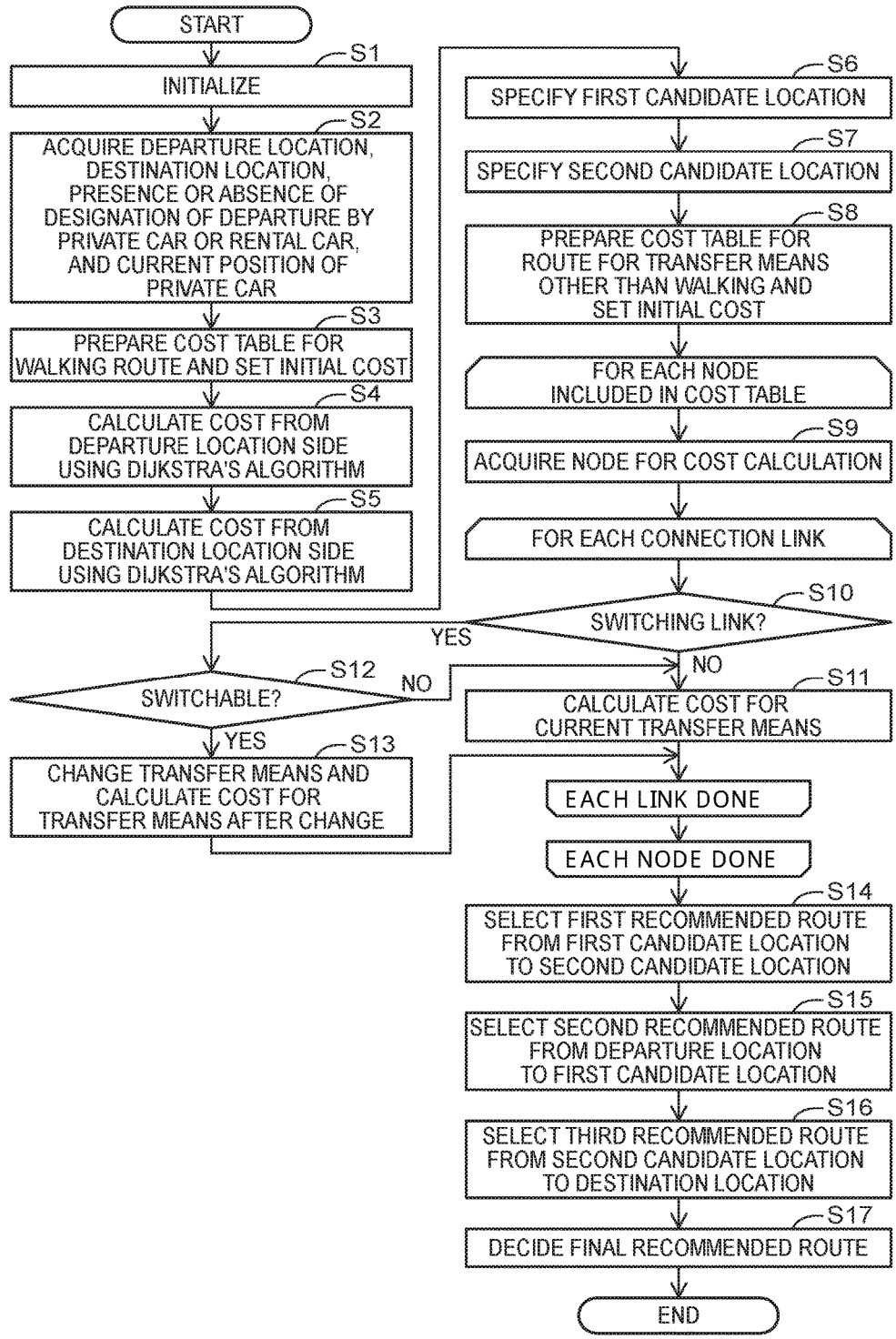
FIG. 3 is a flowchart of route search processing program according to the embodiment.

Subsequently, a route search processing program executed by the CPU 11 in the communication terminal 1 according to the embodiment configured as described above will be described with reference to FIG. 3. FIG. 3 is a flowchart of the route search processing program according to the embodiment. Here, the route search processing program is a program executed when the communication terminal 1 has received a predetermined operation for route search (e.g. an operation for setting a destination location with the navigation application started) to search for a recommended route from a departure location to a destination location. The program illustrated in the flowchart of FIG. 3 described below is stored in the memory 12 of the communication terminal 1, and executed by the CPU 11. A server connected so as to be communicable with the communication terminal 1, rather than the communication terminal 1, may be configured to execute the following processing. In such a case, a recommended route that is finally found is transmitted from the server to the communication terminal 1 so that the communication terminal 1 provides guidance.

In the route search processing program, first, in step (hereinafter abbreviated as "S") 1, the CPU 11 performs predetermined initialization processing.

Next, in S2, the CPU acquires the departure location, the destination location, the presence or absence of designation of departure by a private car or a rental car, and the current position of the private car. The departure location may be the current position of the vehicle, or may be a desired location (e.g. home) designated by the user. The destination location is acquired on the basis of an operation (e.g. an operation of searching for or selecting a facility) by the user received by the input operation section 19. The user can designate departure by the private car or departure by a rental car, in particular, as a route search condition when a route search is started. In the case where departure by the private car or departure by a rental car is designated by the user, the CPU 11 acquires the content of the designation. The current position of the private car may be input by the user, acquired from a preceding travel history, or considered as the home of the user.

Subsequently, in S3, the CPU 11 prepares a cost table on the basis of a departure location node, a destination location node, and the map information 22 stored in the memory 12, and stores the prepared cost table in a storage medium such as the memory 12. Furthermore, the prepared cost table is initialized. The departure location node is a node (e.g. an intersection positioned the closest to the departure location) corresponding to the departure location (e.g. the current position of the user) acquired in S2. The destination location node is a node (e.g. an intersection positioned the closest to the destination location) corresponding to the destination location acquired in S2.

The cost table is a list of nodes (including the departure location node and the destination location node) that connect links that may constitute candidates for a recommended route from the departure location node to the destination location node. In the cost table, each of the nodes in the list is correlated with a minimum added value of search costs from the departure location node to the node, and a preceding node which is a node through which the vehicle passes immediately before the minimum added value is achieved.

Next, in S4 and S5, the CPU 11 calculates a cost value using a Dijkstra's algorithm known in the art. Specifically, route searches are performed from the departure location side and the destination location side, and the minimum added value of the cost values accumulated from the departure location node and the minimum added value of the cost values accumulated from the destination location node are stored in the cost table for each of the nodes listed in the cost table. In the embodiment, it is basically assumed that transfer from the departure location is started by walking and the destination location is reached by walking, and the cost values are calculated on the assumption of transfer by walking. In calculating the cost values on the assumption of transfer by walking, the total of the link lengths is calculated as the cost values without special correction.

After that, in S6, the CPU 11 extracts, as a first candidate location, a node, the minimum added value of the cost values from the departure location node to which is equal to or less than a predetermined threshold (e.g. the distance of which from the departure location is within 5 km) and at which switching can be made from walking to transfer means other than walking. In the case where there is a plurality of such nodes, the nodes are extracted as first candidate locations. In the case where there are a large number of such nodes, however, it is desirable that a predetermined number of (e.g. three) nodes should be extracted as the first candidate locations in the ascending order of the minimum added value of the cost values. Examples of the nodes at which switching can be made from walking to transfer means other than walking include the parking lot in which the private car is parked, stations, bus stops, ports, rental car shops, and airports. If the departure location is a location (such as the parking lot in which the private car is parked, stations, bus stops, ports, rental car shops, and airports, for example) from which transfer can be started by transfer means other than walking, the departure location is also included in the first candidate locations. In the case where the user designates departure the private car or departure by a rental car, in particular as a route search condition when a route search is started, only the departure location is extracted as the first candidate location.

Subsequently, in S7, the CPU 11 extracts, as a second candidate location, a node, the minimum added value of the cost values from the destination location node to which is equal to or less than a predetermined threshold (e.g. the distance of which from the destination location is within 5 km) and at which switching can be made from transfer means other than walking to walking. In the case where there is a plurality of such nodes, the nodes are extracted as second candidate locations. In the case where there are a large number of such nodes, however, it is desirable that a predetermined number of (e.g. three) nodes should be extracted as the second candidate locations in the ascending order of the minimum added value of the cost values. Examples of the nodes at which switching can be made from transfer means other than walking to walking include parking lots, stations, bus stops, ports, rental car shops, and airports. If the destination location is a location (such as parking lots, facilities provided with parking lots, stations, bus stops, ports, rental car shops, and airports, for example) that can be reached by transfer means other than walking, the destination location is also included in the second candidate locations.

In S8, the CPU 11 prepares a cost table in the same manner as in S3 using the first candidate location specified in S6 as the departure location node and using the second candidate location specified in S7 as the destination location node. In the case where there are a plurality of first candidate locations and second candidate locations, each of the first candidate locations and each of the second candidate locations are used as the departure location node and the destination location node, respectively. After that, the cost values are calculated using the Dijkstra's algorithm known in the art, and a search is performed for a recommended route. For example, if locations a to c around the departure location are specified as the first candidate locations and locations d to f around the destination location are specified as the second candidate locations as illustrated in FIG. 4, a search is performed to find routes that include departure from an of the first candidate locations a to c and arrival at any of the second candidate locations d to f. A route with a minimum added cost value, among the routes that have been found, is specified as the recommended route.

Specifically, a route search is performed from the first candidate location side which is the departure location node or the second candidate location side which is the destination location node. In the processing in and after S9, the minimum added value of the cost values accumulated from the departure location node or the minimum added value of the cost values accumulated from the destination location node is stored in the cost table for each of the nodes listed in the cost table.

First, in S9, the CPU 11 acquires nodes, the cost values of which accumulated from the departure location node or the destination location node are to be calculated.

Next, in S10, the CPU 11 determines, for each of connection links connected to the nodes acquired in S9, whether or not the connection link is a link (hereinafter referred to as a "switching link") for transfer by transfer means that is different from the current transfer means. As discussed earlier, the link data and the node data stored in the communication terminal 1 as the map information 22 also have railroad line networks, bus line networks, ship course networks, and airplane course networks in addition to road networks over which vehicles and pedestrians transfer. Thus, in the case where the vehicle is transferring as a private car and the connection link is a link that constitutes a railroad line, for example, the connection link is determined to be a switching link.

In the case where it is determined that the connection link is a switching link for transfer by transfer means that is different from the current transfer means (S10: YES), the processing proceeds to S12. In the case where it is determined that the connection link is not a switching link for transfer by transfer means that is different from the current transfer means (S10: NO), in contrast, the processing proceeds to S11.

In S11, the CPU 11 specifies the cost value of the connection link on the assumption of transfer over the connection link by the current transfer means. For example, in the case where the current transfer means is private car, taxi, or rental car, the cost value is specified on the basis of the link length and in consideration of the road type, road width, the number of lanes, congestion degree, and so forth. In the case where the current transfer means is railroad, the cost value is specified on the basis of the link length and in consideration of the type of a train that travels on the track (such as a subway train, a conventional train, or an express train). The added value of the cost values accumulated from the departure location node or the destination location node is calculated for the nodes acquired in S9 using the specified cost value of the connection link. If the added value is the minimum value, the added value is stored in the cost table.

In S12, meanwhile, the CPU 11 determines whether or not switching from the current transfer means to transfer means for transfer over the connection link is possible. Specifically, the determination is made on the basis of the combination of the current transfer means (first transfer means) and transfer means (second transfer means) for transfer over the connection link and the switching condition table 23 (FIG. 2). In the case of switching to private car, in particular, the determination is made in consideration of the current position of the private car acquired in S2.

For example, in the case where a road link 31 on which a private car travels and a line link 32 on which a train travels are connected to each other and a station as a node between the links supports the park-and-ride scheme as illustrated in FIG. 5, it is determined on the basis of the switching condition table 23 that the transfer means can be switched from private car to railroad.

In the case where a road link 33 on which a private car travels and a course link 34 on which a ship (for passengers) transfers are connected to each other and a port as a node between the links does not support the park-and-ride scheme as illustrated in FIG. 5, on the other hand, it is determined on the basis of the switching condition table 23 that the transfer means cannot be switched from private car to ship (for passengers).

In the case where it is determined that switching can be made from the current transfer means to transfer means for transfer over the connection link (S12: YES), the processing proceeds to S13. In the case where it is determined that switching cannot be made from the current transfer means to transfer means for transfer over the connection link (S12: NO), the processing proceeds to S11.

In S13, the CPU 11 changes the transfer means from the current transfer means to transfer means for transfer over the connection link. The CPU 11 then specifies the cost value of the connection link as in S11 on the assumption of transfer over the connection link by the transfer means after the change. The added value of the cost values accumulated from the departure location node or the destination location node is calculated for the nodes acquired in S9 using the specified cost value of the connection link. If the added value is the minimum value, the added value is stored in the cost table.

After that, in S14, the CPU 11 selects a route, for which the added value of the cost values accumulated from the departure location node or the destination location node calculated in S8 to S13 is the minimum, as a recommended route (first recommended route) from the first candidate location to the second candidate location.

Next, in S15, the CPU 11 selects, on the basis of the cost table prepared in S3 to S5, a recommended route (second recommended route) from the departure location acquired in S2 to a first candidate location (hereinafter referred to as a "first switching location") corresponding to the departure location of the first recommended route selected in S14. In the case where the departure location acquired in S2 corresponds to the first switching location, the processing in S15 is not necessary.

Subsequently, in S16, the CPU 11 selects, on the basis of the cost table prepared in S3 to S5, a recommended route (third recommended route) from the second candidate location (hereinafter referred to as a "second switching location") corresponding to the destination location of the first recommended route selected in S14 to the destination location acquired in S2. In the case where the destination location acquired in S2 corresponds to the second switching location, the processing in S16 is not necessary.

After that, in S17, the CPU 11 finally decides a route obtained by coupling the first recommended route, the second recommended route, and the third recommended route to each other as a recommended route (final recommended route) from the departure location to the destination location. For example, in the example illustrated in FIG. 6, a route from the first candidate location c to the second candidate location d, among the first candidate locations a to c and the second candidate locations d to f, is selected as the first recommended route. As a result, a route that includes transfer by walking from the departure location to the first candidate location c as the first switching location, transfer to the second candidate location d as the second switching location after switching from walking to other transfer means at the first candidate location c, and transfer by walking from the second candidate location d to the destination location is determined as the final recommended route. The first recommended route from the first switching location to the second switching location may be a route for transfer by only one transfer means (e.g. railroad), and may be a route for transfer with switching between a plurality of transfer means (e.g. bus, railroad, and walking). In the case where the departure location or the destination location is specified as the first switching location or the second switching location, the final recommended route does not include the second recommended route or the third recommended route.

After that, guidance on the final recommended route decided in S17 is provided to the user via the display 18 etc. The final recommended route, guidance on which is provided on the basis of a subsequent operation by the user, is set as the route for guidance for the navigation function, and guidance on travel and switching between transfer means is provided on the basis of the set route for guidance.

In the communication terminal 1 according to the embodiment, the route search method performed by the communication terminal 1, and the computer program executed by the communication terminal 1, as has been described in detail above, in the case where a search is performed for a recommended route for transfer with switching between a plurality of transfer means, a condition for switching from first transfer means to second transfer means that is different from the first transfer means is set on the basis of a combination of the first transfer means and the second transfer means, and a search is performed (S1 to S17) for a recommended route for transfer with switching between a plurality of transfer means in accordance with the set condition. Thus, it is possible to prevent an infeasible route from being found as in the related art. In addition, transfer is not limited to use of particular transfer means, but optimum transfer means can be selected from among the plurality of transfer means in accordance with the situation, and switching between the transfer means can be made without contradiction. Thus, it is possible to find a more appropriate route for a user.

It should be understood that the embodiment described above is not limiting, and that various improvements and modifications may be made without departing from the scope and spirit of the inventive principles.

For example, in the embodiment, a route search is performed for transfer means such as walking, private car, taxi, rental car, railroad, bus, ship, and airplane as illustrated in FIG. 2. However, a route search may be performed for transfer means other than the transfer means indicated in FIG. 2. For example, the transfer means may include bicycle.

In the embodiment, the condition for switching prescribed in the switching condition table 23 illustrated in FIG. 2 includes not only whether or not switching is possible but also a condition under which the switching can be made in the case where the switching is possible. However, a condition under which the switching cannot be made may be prescribed in place of the condition under which the switching can be made.

In the embodiment, all the conditions for switching between transfer means are prescribed in advance in the switching condition table 23 illustrated in FIG. 2. However, conditions for switching between transfer means may be derived through computation processing or the like performed during route search without using a table.

In the embodiment, a search for a recommended route is performed using the Dijkstra's algorithm. However, the route search means may use other algorithms (Bellman-Ford algorithm, breadth first search).

The above-described principles may be applied to a system that has a communication terminal and a server, rather than a communication terminal alone. In such a case, each step of the route search processing program (FIG. 3) discussed above may be performed by any of the server and the communication terminal. In the case where all the route search processing program is executed by the server, information on the departure location, the destination location, the presence or absence of designation of departure by a private car or a rental car, and the current position of the private car is acquired through communication from the communication terminal, the route search processing program illustrated in FIG. 6 is executed by the server, and thereafter a recommended route that is finally found is transmitted to the communication terminal.

While a route search system according to a specific embodiment has been described above, the route search system may be configured as described below, and the following effect can be achieved in such cases.

For example, a first configuration is as follows.

A route search system (e.g., communication terminal 1) that searches for a recommended route for transfer with switching between a plurality of transfer means, includes: link information acquisition means (e.g., CPU 11) for acquiring link information (e.g., map information 22) for specifying a link for transfer by each of the plurality of transfer means and connection information (e.g., map information 22) related to connection between links for transfer by different transfer means; condition setting means (e.g., CPU 11) for setting a condition for switching from first transfer means to second transfer means, which is different from the first transfer means, on the basis of a combination of the first transfer means and the second transfer means; and route search means (e.g., CPU 11) for searching for the recommended route for transfer with switching between the plurality of transfer means on the basis of the link information, the connection information, and the condition set by the condition setting means, the recommended route connecting links for transfer by different transfer means.

With the route search system configured as described above, it is possible to prevent an infeasible route from being found as in the related art, by setting a condition for switching between transfer means on the basis of a combination of the transfer means in the case where a search is performed for a recommended route for transfer with switching between a plurality of transfer means. In addition, transfer is not limited to use of particular transfer means, but optimum transfer means can be selected from among the plurality of transfer means in accordance with the situation, and switching between the transfer means can be made without contradiction. Thus, it is possible to find a more appropriate route for a user.

A second configuration is as follows.

The condition setting means (e.g., CPU 11) sets not only whether or not switching from the first transfer means to the second transfer means is possible but also a condition under which the switching can be made, or a condition under which the switching cannot be made, in the case where the switching is possible.

With the route search system configured as described above, it is possible to prevent the route that has been found from including switching between transfer means that is infeasible for the user. Meanwhile, the route that has been found can include transfer by transfer means (such as rental car and car ferry, for example), switching from other transfer means to which can be made under a complicated condition.

A third configuration is as follows.

The condition setting means (e.g., CPU 11) sets, as a condition, a location at which switching can be made from the first transfer means to the second transfer means.

With the route search system configured as described above, it is possible to appropriately set a condition for switching of the transfer means to transfer means (such as airplane and ship, for example), transfer by which can be started only at a limited location. As a result, it is possible to prevent an infeasible route from being found as in the related art.

A fourth configuration is as follows.

In the case where the second transfer means is a private car, the condition setting means (e.g., CPU 11) sets a condition that a location at which switching can be made from the first transfer means to the second transfer means is a location at which the private car is parked.

With the route search system configured as described above, it is possible to appropriately set a condition for switching of the transfer means to private car, transfer by which can be started only at a particularly limited location. As a result, it is possible to prevent an infeasible route from being found as in the related art.

A fifth configuration is as follows.

The route search system further includes a switching condition table (23) that prescribes a condition for switching between a plurality of the different transfer means for each combination of the transfer means, and the condition setting means (e.g., CPU 11) sets a condition for switching from the first transfer means to the second transfer means on the basis of the switching condition table.

With the route search system configured as described above, a condition for switching between transfer means can be easily specified by referencing the switching condition table. As a result, it is possible to reduce the processing burden related to route search.

A sixth configuration is as follows.

The route search means (e.g., CPU 11) specifies, as a first candidate location, a location which is located within a predetermined distance from a departure location and at which switching can be made from walking to transfer means other than walking, specifies, as a second candidate location, a location which is located within a predetermined distance from a destination location and at which switching can be made from transfer means other than walking to walking, and searches for the recommended route from the departure location to the destination location from a combination of a recommended route for transfer by walking from the departure location to the first candidate location, a recommended route for transfer with switching between the plurality of transfer means from the first candidate location to the second candidate location, and a recommended route for transfer by walking from the second candidate location to the destination location.

With the route search system configured as described above, it is possible to find, as the recommended route, an optimum route for transfer with switching between walking and other transfer means from the departure location, to the destination location. In addition, it is possible to find a route that allows reliably reaching the destination location even if the departure location or the destination location is a location that can be reached only by walking.

A seventh configuration is as follows.

The plurality of transfer means includes two or more of walking, private car, taxi, rental car, railroad, bus, ship, and airplane.

With the route search system configured as described above, it is possible to prevent an infeasible route from being found as in the related art, by setting a condition for switching between transfer means on the basis of a combination of the transfer means in the case where a search is performed for a recommended route for transfer with switching among a large number of transfer means.

The invention claimed is:

1. A route search system that searches for a recommended route for transfer with switching between a plurality of transportation modes, comprising:
    a memory that stores a switching condition table that prescribes a condition for switching between a plurality of different transportation modes for each combination of the transportation modes; and
    a processor programmed to:
        acquire link information for specifying a link for transfer by each of the plurality of transportation modes and connection information related to connection between links for transfer by different transportation modes;
        set a first condition for switching from a first transportation mode to a second transportation mode, which is different from the first transportation mode, on the basis of a combination of the first transportation mode and the second transportation mode and the stored switching condition table;
        in the case where the switching is possible, set a second condition under which the switching can be made, or under which the switching cannot be made; and
        search for the recommended route for transfer with switching between the plurality of transportation modes on the basis of the link information, the connection information, the set first condition and the set second condition, the recommended route connecting links for transfer by different transportation modes; and
        output the recommend route found by the search for display on a display.

2. The route search system according to claim 1, wherein the processor is programmed to:
    set, as the first condition, a location at which switching can be made from the first transportation mode to the second transportation mode.

3. The route search system according to claim 1, wherein the processor is programmed to:
    in the case where the second transportation mode is a private car, set the first condition that a location at which switching can be made from the first transportation mode to the second transportation mode is a location at which the private car is parked.

4. The route search system according to claim 1, wherein the processor is programmed to:
- specify, as a first candidate location, a location which is located within a predetermined distance from a departure location and at which switching can be made from walking to transportation modes other than walking;
- specify, as a second candidate location, a location which is located within a predetermined distance from a destination location and at which switching can be made from transportation modes other than walking to walking; and
- search for the recommended route from the departure location to the destination location from a combination of a recommended route for transfer by walking from the departure location to the first candidate location, a recommended route for transfer with switching between the plurality of transportation modes from the first candidate location to the second candidate location, and a recommended route for transfer by walking from the second candidate location to the destination location.

5. The route search system according to claim 1, wherein:
the plurality of transportation modes includes two or more of walking, private car, taxi, rental car, railroad, bus, ship, and airplane.

6. A route search method for searching for a recommended route for transfer with switching between a plurality of transportation modes, comprising:
- accessing a memory that stores a switching condition table that prescribes a condition for switching between a plurality of different transportation modes for each combination of the transportation modes;
- acquiring link information for specifying a link for transfer by each of the plurality of transportation modes and connection information related to connection between links for transfer by different transportation modes;
- setting a first condition for switching from a first transportation mode to a second transportation mode, which is different from the first transportation mode, on the basis of a combination of the first transportation mode and the second transportation mode and the stored switching condition table;
- in the case where the switching is possible, setting a second condition under which the switching can be made, or under which the switching cannot be made;
- searching for the recommended route for transfer with switching between the plurality of transportation modes on the basis of the link information, the connection information, the set first condition and the set second condition, the recommended route connecting links for transfer by different transportation modes; and
- outputting the recommend route found by the search for display on a display.

7. A computer-readable storage medium storing a computer program for searching for a recommended route for transfer with switching between a plurality of transportation modes, the computer program causing a computer to:
- access a memory that stores a switching condition table that prescribes a condition for switching between a plurality of different transportation modes for each combination of the transportation modes;
- acquire link information for specifying a link for transfer by each of the plurality of transportation modes and connection information related to connection between links for transfer by different transportation modes;
- set a first condition for switching from a first transportation mode to a second transportation mode, which is different from the first transportation mode, on the basis of a combination of the first transportation mode and the second transportation mode and the stored switching condition table;
- in the case where the switching is possible, set a second condition under which the switching can be made, or under which the switching cannot be made;
- search for the recommended route for transfer with switching between the plurality of transportation modes on the basis of the link information, the connection information, the set first condition and the set second condition, the recommended route connecting links for transfer by different transportation modes; and
- output the recommend route found by the search for display on a display.

* * * * *